US009485333B2

(12) United States Patent
Singer et al.

(10) Patent No.: US 9,485,333 B2
(45) Date of Patent: Nov. 1, 2016

(54) METHOD AND APPARATUS FOR NETWORK STREAMING

(71) Applicants: Stefan Singer, Vaterstetten (DE); Jochen M. Gerster, Stuttgart (DE); Heinz Wrobel, Gauting (DE)

(72) Inventors: Stefan Singer, Vaterstetten (DE); Jochen M. Gerster, Stuttgart (DE); Heinz Wrobel, Gauting (DE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 260 days.

(21) Appl. No.: 14/087,683

(22) Filed: Nov. 22, 2013

(65) Prior Publication Data

US 2015/0149652 A1    May 28, 2015

(51) Int. Cl.
*G06F 15/16*    (2006.01)
*H04L 29/06*    (2006.01)

(52) U.S. Cl.
CPC ............. *H04L 69/22* (2013.01); *H04L 65/602* (2013.01); *H04L 69/16* (2013.01)

(58) Field of Classification Search
CPC ....................................................... H04L 69/16
USPC ....................................................... 709/231
See application file for complete search history.

(56) References Cited

U.S. PATENT DOCUMENTS

| 5,878,028 | A | 3/1999 | Roy et al. | |
| 6,697,366 | B1 | 2/2004 | Kim | |
| 7,076,560 | B1 * | 7/2006 | Lango | H04L 49/90 709/213 |
| 9,336,162 | B1 * | 5/2016 | Sathe | G06F 12/0802 |
| 2003/0115350 | A1 * | 6/2003 | Uzrad-Nali | H04L 29/06 709/231 |
| 2004/0057434 | A1 * | 3/2004 | Poon | H04L 12/56 370/392 |
| 2004/0073724 | A1 * | 4/2004 | Wilson | H04L 49/90 710/52 |
| 2008/0049619 | A1 * | 2/2008 | Twiss | H04L 45/04 370/236 |
| 2009/0028150 | A1 * | 1/2009 | Johnsen | H04L 45/00 370/392 |
| 2009/0240793 | A1 * | 9/2009 | Zhang | H04L 49/90 709/223 |
| 2009/0304029 | A1 * | 12/2009 | Zhou | G06F 12/1081 370/474 |
| 2011/0194439 | A1 * | 8/2011 | Maze | H04L 49/901 370/252 |
| 2013/0226400 | A1 * | 8/2013 | King | G08G 1/167 701/36 |

OTHER PUBLICATIONS

Extended European Search Report dated Apr. 18, 2013 in EP Application No. 12193879.9.

* cited by examiner

*Primary Examiner* — Hamza Algibhah (57) ABSTRACT

A method of data streaming in a streaming system (200) that comprises a processor (202) and a controller (204) operably coupled to a streaming peripheral (214) via a shared interconnect (206) is described. The method comprises at the controller, receiving at least one descriptor that points to at least one header data element in memory and at least one payload buffer element in the streaming peripheral (214); reading the at least one descriptor (211) by the controller (204); fetching by the controller the at least one header data element from memory and the at least one payload element from the payload buffer (212) in the streaming peripheral (214) referred to by the descriptor (211).

20 Claims, 8 Drawing Sheets

METHOD AND APPARATUS FOR NETWORK STREAMING

FIELD OF THE INVENTION

The field of this invention relates to a method and apparatus, such as a controller and a streaming peripheral, for network streaming, for example Ethernet streaming.

BACKGROUND OF THE INVENTION

In the field of computing and data communications there are many different networking standards, with one of the most widely used being Ethernet. Ethernet is known as a family of computer networking technologies for local area networks (LANs). Ethernet was commercially introduced in 1980 and standardized in 1985 as IEEE 802.3. Ethernet has largely replaced competing wired LAN technologies and has thus become a primary industry standard for data communications. Systems communicating over Ethernet divide a stream of data into shorter pieces called frames. Each frame contains source and destination addresses as well as error-checking data so that damaged data can be detected and re-transmitted. As per the OSI physical layer model, Ethernet provides services up to and including the data link layer.

In most applications that use the Ethernet, the actual data in question is copied at least once by a central processing unit (CPU). There are a multitude of reasons, why the data is copied at least once, including:

(i) The CPU copies data for memory protection between kernel and user space.
(ii) Ethernet controllers typically have some alignment restrictions on the location of the payload data. These alignment restrictions may conflict with the attributes of the data generated in a streaming source, or consumed in a streaming sink.
(iii) The software architecture used in building the application has typically a natural split into drivers, for example the Ethernet interface and drivers for the streaming source or sink, which has implications on how payload buffers are managed.

Figure 1:
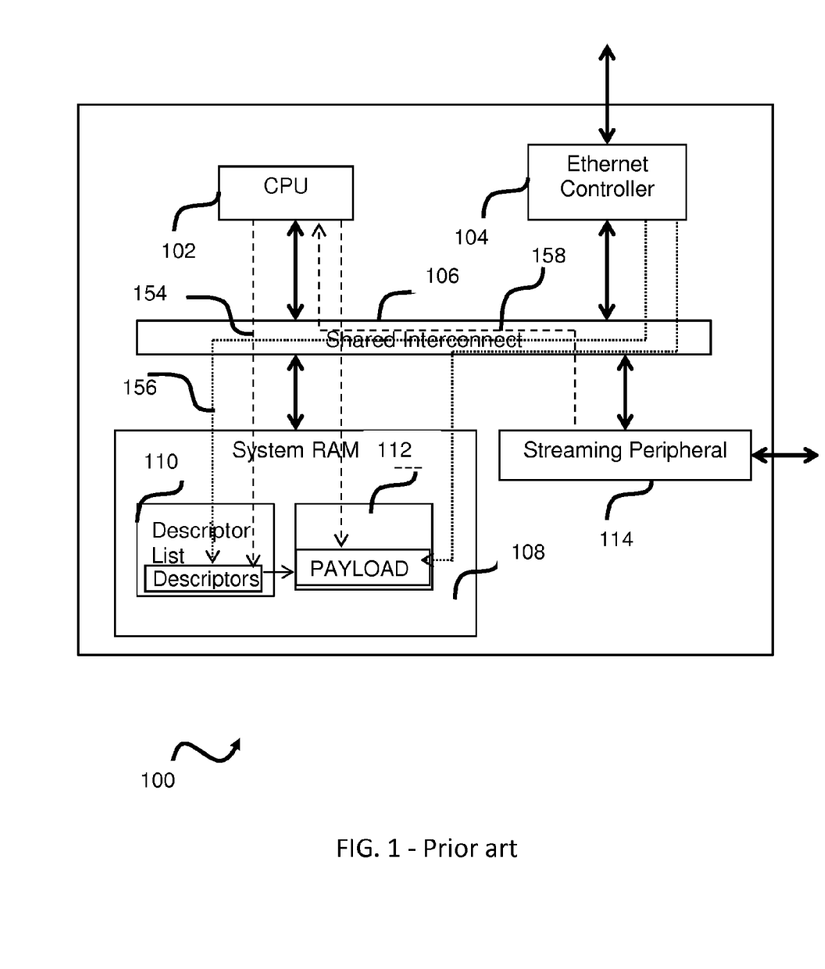
FIG. 1 illustrates a simplified block diagram and data transfer flow of a known streaming system.

FIG. 1 illustrates a block diagram and data transfer flow of a typical streaming system 100 that comprises shared interconnect 106. The shared interconnect 106 operably couples a central processing unit (CPU) 102, a system random access memory (RAM) 108 that comprises at least a descriptor list 110 and payload buffer 112, an Ethernet controller 104, and a streaming peripheral 114. In this illustrated example, CPU 102, Ethernet controller 104, system RAM 108 and streaming peripheral 114 each transmit and receive information via the shared interconnect 106.

In traditional data flow operation, the streaming peripheral 114 indicates to the CPU 102 that it has payload available, for example indicated in interrupt signal 158. This causes the CPU 102 to make a copy of the payload, and to store this copy into a buffer in the system RAM 108, more specifically, within the payload buffer 112. The CPU 102 then prepares a descriptor 154 that points to the location of the payload buffer 112 within the system RAM 108. The Ethernet medium access control (MAC) layer within the Ethernet controller 104 fetches 156 the descriptor from the descriptor list 110, which refers the Ethernet controller 104 to the correct payload within the payload buffer 112, reads the descriptor and reads the payload referred to by that descriptor.

However, problems may arise when data is copied during high bandwidth streaming, as this copying process consumes significant CPU resources. This means that high bandwidth streaming prevents the use of smaller, cheaper, CPU cores. Also the streaming system 100 would require higher throughput on interconnects and memory, since data needs to be transferred multiple times. All these factors increase power consumption of the streaming system.

SUMMARY OF THE INVENTION

The present invention provides a method of data streaming in a streaming system, for example to enable streaming of high bandwidth data, a streaming peripheral and a controller, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to the accompanying drawings in which examples of methods and apparatus for data streaming are described with reference to an Ethernet implementation comprising descriptor models to initiate their own Read-/Write transactions. Examples of the present invention comprise streaming sources and/or streaming sinks. Examples of the present invention are described with reference to streaming applications for use with any network, such as Ethernet (video) cameras, Audio streaming nodes (e.g. Ethernet Audio Amplifier) or nodes transferring high bandwidth sensor data (e.g. Radar data) over a network.

Examples of the invention are described with respect to a combination of two elements: (i) optimized driver software architecture to compose one Ethernet frame from multiple sub buffers generated by different sources; and (ii) optimized hardware architecture for direct streaming from source/sink to the Ethernet Controller. In particular, a mechanism is described that enables the streaming system to reduce the involvement of the CPU, and particularly reduce the CPU making as many copies of data, during high bandwidth streaming.

However, it is envisaged that the same methodologies may be applied to other communication interfaces that have similar descriptor models and can also initiate their own Read-/Write transactions. Typically modern Ethernet Controller blocks use some form of descriptor model. The CPU core updates those descriptors and then the Ethernet MAC can fetch or write that data autonomously without the CPU ever touching that data.

In contrast to a traditional data flow operation, whereby the CPU core is informed of payload being ready in a peripheral and copying the payload into a buffer in the system RAM, prior to the CPU preparing a descriptor that points to the location of the payload buffer in the system RAM, examples of the invention propose a processor (such as a CPU) preparing header data for a network interface and preparing at least one descriptor that points to at least one header data element and at least one payload buffer element, notably located in the streaming peripheral. Thereafter, examples of the invention propose that the controller (such as an Ethernet medium access controller (MAC)) reads the at least one descriptor and fetches at least one header data element from memory (such as system random access memory (SRAM)) and the at least one payload element from the payload buffer in the streaming peripheral referred to by the descriptor.

In some examples, the method may comprise reading a number of registers in the streaming peripheral and determining, in response thereto, information relating to a location of the payload in the payload buffer of the streaming peripheral. In some examples, preparing header data for the network interface may comprise at least one of: generating a separate header, updating network frame header data. In some examples, the streaming peripheral may be a camera comprising a video encoder and memory, where the payload comprises image data. In some examples, the streaming peripheral may be a PDI interface or an audio interface.

In some examples, the at least one header data element may be stored in system random access memory (SRAM) and the at least one payload element may be stored in a video encoder output buffer. In some examples, the header data element and the at least one payload element may be stored in distinct address ranges in memory.

Examples of the invention further describe a streaming peripheral for use in a streaming system that comprises a processor and a controller that is operably coupled to the streaming peripheral via a shared interconnect. The streaming peripheral comprises an addressable payload buffer area identifiable by a descriptor, wherein the addressable payload buffer area comprises a data payload; and an interface operably coupled to the addressable payload buffer area, wherein the addressable payload buffer area is arranged to be directly accessible by the controller and the data payload fetched from the streaming peripheral across the interface by the controller is based on the identifying descriptor.

Examples of the invention further describe a controller for use in a streaming system that comprises a processor and a streaming peripheral operably coupled to the controller via a shared interconnect. The controller comprises a logic circuit arranged to read at least one descriptor created by the processor that points to at least one header data element in memory and at least one payload buffer element in the streaming peripheral; and a fetching module operably coupled to the logic circuit and arranged to directly access the at least one header data element from memory and the at least one payload element from the payload buffer in the streaming peripheral referred to by the descriptor.

In some examples, the Ethernet Controller described herein may be implemented at least in part in hardware, for example implemented within an integrated circuit device comprising at least one die within a single integrated circuit package. Because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 2:
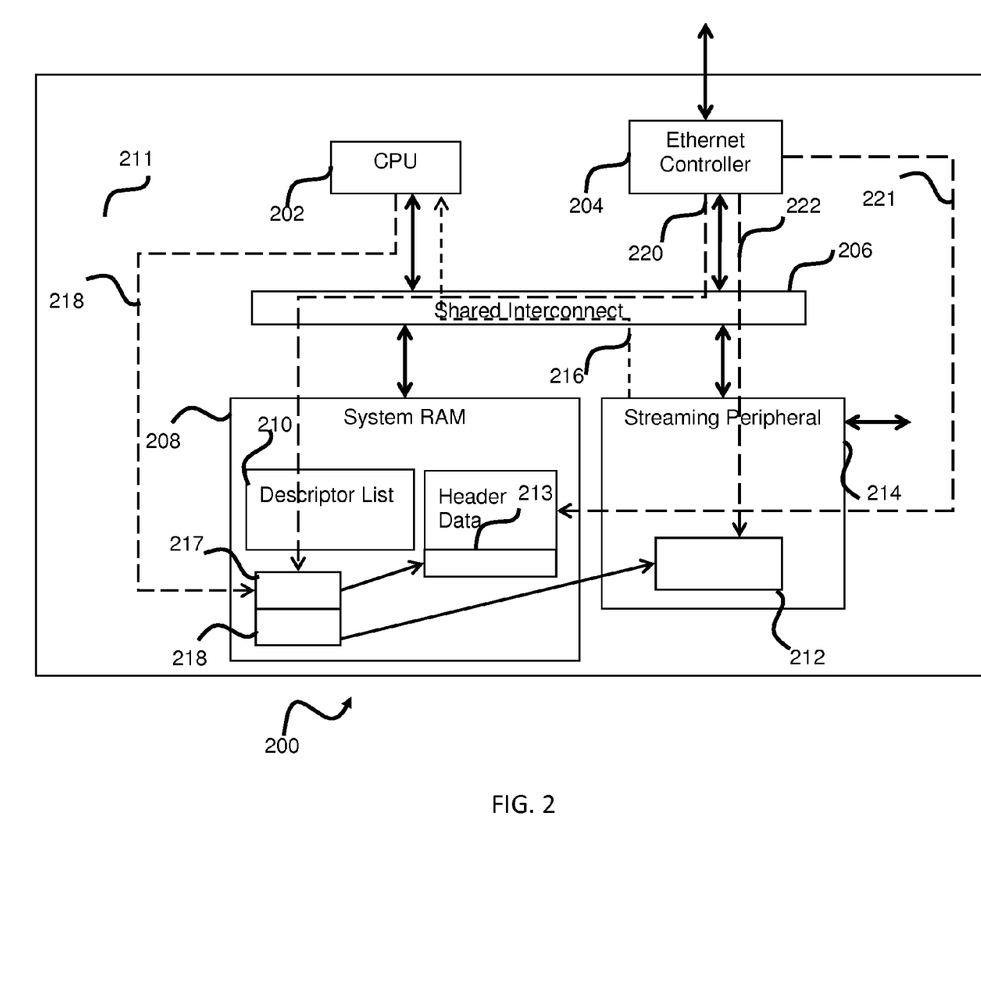
FIG. 2 illustrates an example flow diagram of data transfer in an optimized streaming system.

FIG. 2 illustrates a streaming system and associated data transfer 200, in accordance with an example embodiment of the invention. The streaming system 200 comprises shared interconnect 206, with a processor, such as CPU 202, Ethernet controller 204, system RAM (SRAM) 208 (comprising descriptor list 210 having at least descriptors 217, 218 and a pool of header buffers including header data 213), and streaming peripheral 214, notably comprising a memory/payload buffer 212, operably coupled to one another via the shared interconnect 206. In one example, the streaming peripheral 214 comprises a camera. However in other example embodiments, the streaming peripheral 214 may comprise a video interface or an audio interface, for example in a form of a Parallel Data Interface (PDI). In one example, the header data 213 comprises frame header data.

Initially, the streaming peripheral 214 generates an interrupt signal 216 once a certain amount of data has been generated. The CPU 202 then reads a number of registers in the streaming peripheral 214 itself and based thereon determines information relating to the location of the payload in the buffer area 212 of the streaming peripheral 214. The CPU then generates frame header data for a network interface and prepares descriptors 217 and 218 that point to the header data 213 and payload buffer 212. The generated header information contains at least one header fragment, but may also comprise of multiple header elements, where a separate descriptor is generated for each of those multiple header elements. The Ethernet controller 204 reads 220 descriptors 217, 218, and fetches 221 first the header data 213 from the SRAM 208 referred to by descriptor 217 and then 222 the payload from the payload buffer 212 referred to by descriptor 218.

Thus, examples of the invention propose the CPU preparing separate descriptors 217, 218 that point to the header data 213 located in SRAM 208 and the payload buffer 212. Thereafter, examples of the invention propose that the Ethernet medium access control (MAC) layer within Ethernet controller 204 fetches the descriptors from the descriptor list 210, which refers the Ethernet controller 204 to the header data 213 within the SRAM 208 and the correct payload 212. The Ethernet controller 204 then reads the header data 213 referred to by descriptor 217 and reads the payload 212 referred to by that descriptor 218.

Notably, in this example, the CPU 202 is no longer required to copy the payload from the streaming peripheral 214 to the system RAM 208. Instead, the CPU 202 is arranged to merely prepare header data 213 and descriptors 217, 218 so that the Ethernet controller 204 is able to fetch the payload 212. The Ethernet Controller 204 may compose one Ethernet Frame from those multiple data fragments by control through the descriptor elements 217, 218. Therefore, for high bandwidth streaming, the illustrated example of FIG. 2 separates the CPU 202 from the streaming functionality of the system 200, thereby allowing a smaller, cheaper CPU to be utilized in the above illustrated example.

Figure 3:
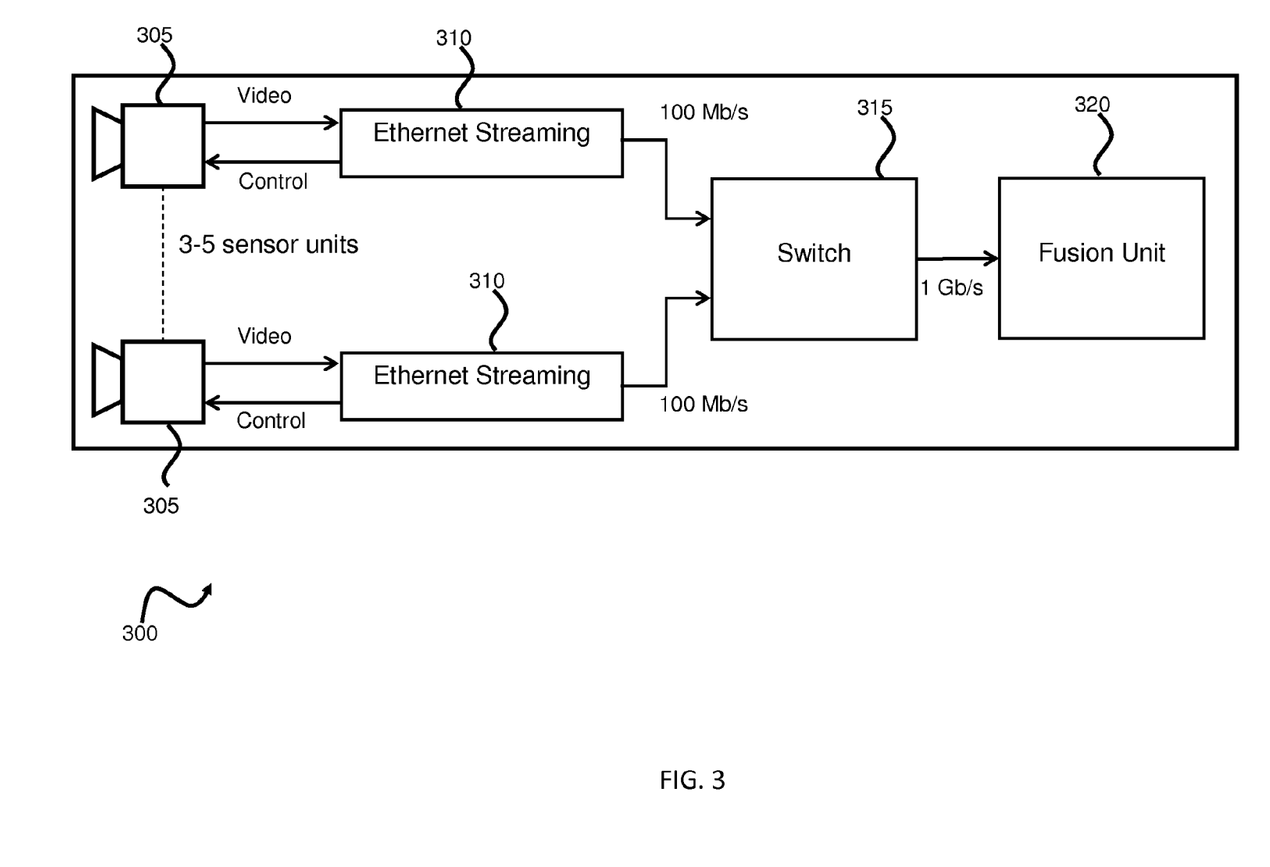
FIG. 3 illustrates a simplified block diagram of an example of a part of a video streaming system.

Referring now to FIG. 3, a simplified block diagram of an example of a part of a video streaming system is illustrated. In one example, the Ethernet application may be an active safety and advanced driver assistance system (ADAS), for example configured to support panorama view park-assist that aims to provide a high quality view of the vehicle's surroundings (typically a bird's eye view). For such an Ethernet application, up to five CMOS-based cameras 305 with wide-angle lenses may be attached to a vehicle. Each camera 305 in FIG. 3 may be connected to a respective single Ethernet streaming device 310 via a parallel digital interface (not shown). A typical installation may have one camera at each corner of the front bumper, one in each side mirror and one in the rear. All sensors are connected via a switch 315 to a central fusion Electronic Control Unit (ECU) 320 that performs enhancement and image generation.

Figure 4:
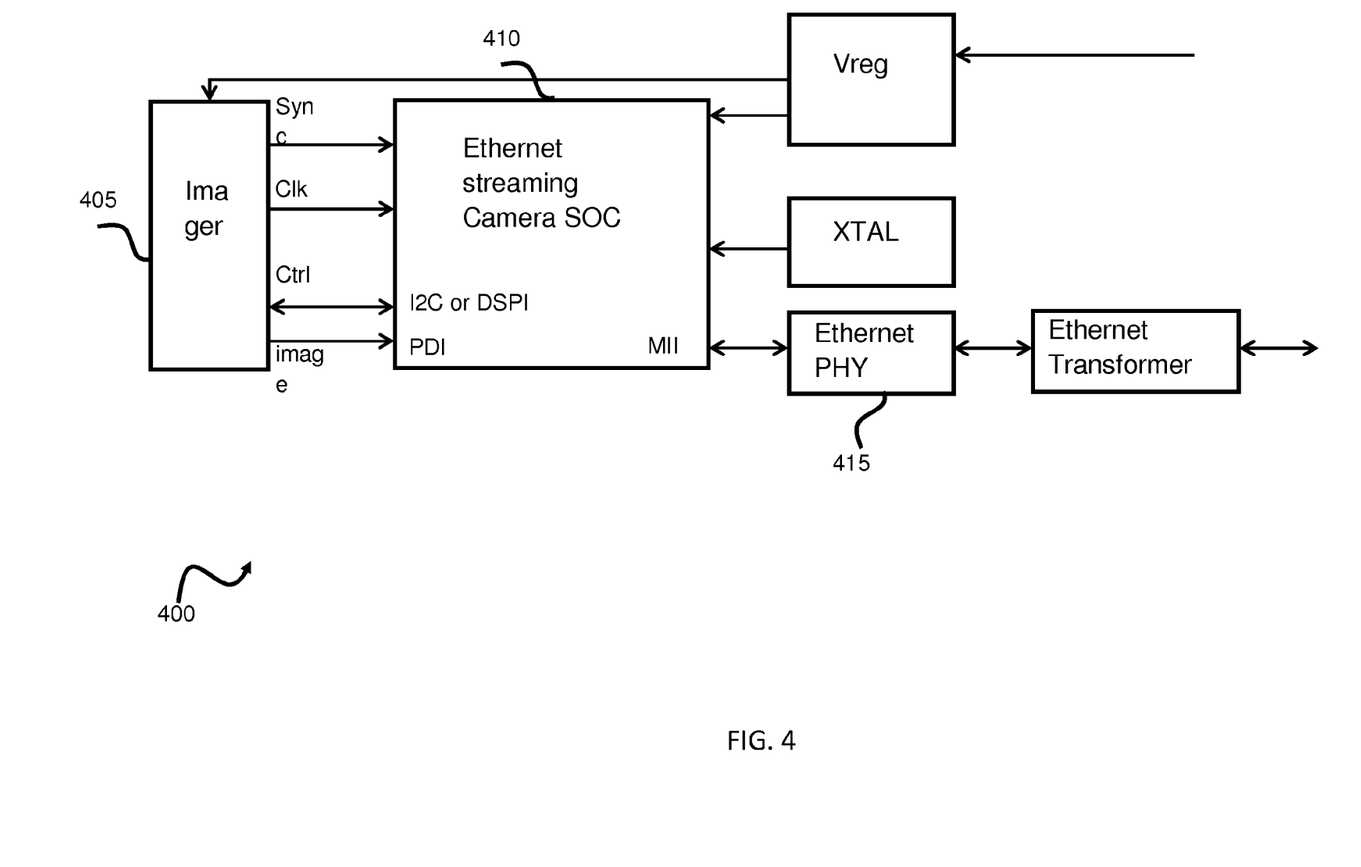
FIG. 4 illustrates a further more detailed block diagram of the example of a part of a video streaming system of FIG. 3.

Referring now to FIG. 4, a further more detailed block diagram of the plurality of cameras, such as cameras 305 from FIG. 3 is illustrated. An image sensor 405 receives the image and provides the image data to the Ethernet streaming device 410. The raw data may be buffered and the colour component may be vertically sub-sampled from YUV4:2:2 to YUV4:2:0. A low latency video encoder (not shown) may compress the image data by, say, a factor of 1:5/1:10 or higher into a bit stream. This compression is not lossless, thus, the quality of the image is degraded with higher compression ratios. The video bit stream is then buffered in the dedicated video bit stream buffer of an example embodiment of the invention and transmitted via the Ethernet physical layer link 415 to the switch 315 and thereafter to the central fusion ECU 320 of FIG. 3.

In one example, the central fusion ECU 320 first corrects any wide-angle distortion in each image, if not performed optically. Thereafter, the central fusion ECU 320 performs a stitching operation of the images, which may be similar to the feature found on many of today's digital cameras. In principle, similarities in adjacent images may be identified, e.g., by running matching filters. After identifying how the images fit geometrically together, in some example, some post-processing may be necessary to achieve a smooth appearance within the overlapping areas. Finally, the central fusion ECU 320 renders the stitched images on a 3D grid model representing the chosen perspective to generate the final image. The interconnection between the remote cameras and central fusion ECU 320 may be performed in a point-to-point manner with a switch located in a central ECU. In other examples, more ADAS nodes (e.g., cameras and RADARs in the bumper) may have two dedicated ADAS switches.

Figure 5:
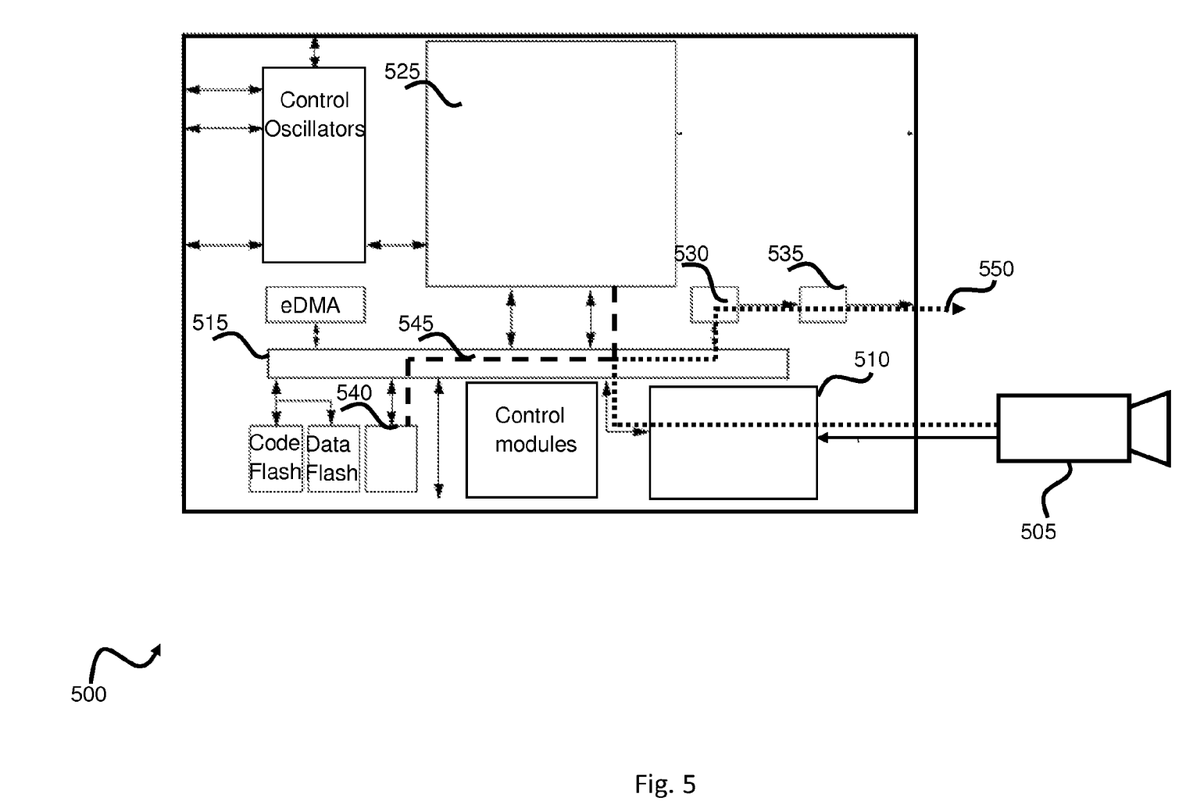
FIG. 5 illustrates an example of an optimized Ethernet camera streaming SOC (System on Chip) controller comprising a CPU core.

Referring now to FIG. 5, there is illustrated an example block diagram of an optimized Ethernet camera streaming SOC (System on Chip) 500. In this illustrated example, the Ethernet Streaming Device 500 comprises, among other things, a camera 505, a video encoder 510, a Cross Bar Switch (XBAR) 515, a CPU core 525, a fast Ethernet controller (FEC) module 530, an IEEE 1588 precision timing stamp (PTP) module 535, header data 545, payload data 550 and static system random access memory (SRAM) 540.

In this example, video data is captured by the camera 505 and streamed 550 to the video encoder 510. In this example, camera 505 comprises a camera sensor (1280×800@ 30 Frames per second and 10-12 bits/pixel). The video encoder 510 comprises a parallel date interface that streams the video data 550 to an MJPEG encoder and an output buffer (not shown). The MJPEG encoder compresses the video data using JPEG encoding, and then stores this encoded data in the output buffer. In this manner, the image data is encoded and passed to the output buffer of the video encoder 510. The MJPEG encoder further divides the encoded data into packages transferable over Ethernet. Software is used to control the MJPEG encoder so that the data rate can be controlled to prevent the output buffer overflowing. This is achieved by altering the image quality of the encoding, thereby reducing the number of bytes per image.

The video encoder 510 then notifies the CPU 525, that data is available. The CPU core 525 then, in this example, prepares frame header data 545 in the SRAM 540 and prepares descriptors for the FEC module 530, that point to the header data 545 and the transmit data. The CPU core 525 triggers the FEC module 530 to fetch the task description from the SRAM 540. The FEC module 530 then obtains the instruction from SRAM 540, which enables the FEC module 530 to directly obtain the header data 545 from the SRAM 540 and the encoded data 550 from the output buffer of the video encoder 510. Advantageously, the output buffer, is directly accessible by the FEC via by-passing the CPU core 525, e.g. without the CPU core 525 copying the data from SRAM 540, in contrast to known architectures. The FEC module 530 then transfers the data 550 to the Ethernet+PTP module 535, which precision time stamps the data to allow the PTP stack (not shown) to measure network delay.

The data 550 for the FEC frames, in this example embodiment, reside in memory external to the FEC, in this case in the output buffer of the video encoder 510. The FEC is pointed to the encoded data in the output buffer by accessing a buffer descriptor located in external memory (which may be further SRAM). This buffer descriptor contains a starting address (pointer), data length, and status/control information (which contain the current state of the buffer).

Thus, using the described architecture, it is possible for data to be streamed in real-time without the CPU being directly involved in the data transfer. By distancing the CPU core 525 from the actual data transmission (data highway bypassing the core), copying of the data is prevented, thereby allowing a smaller CPU core 525 to be used.

Figure 6:
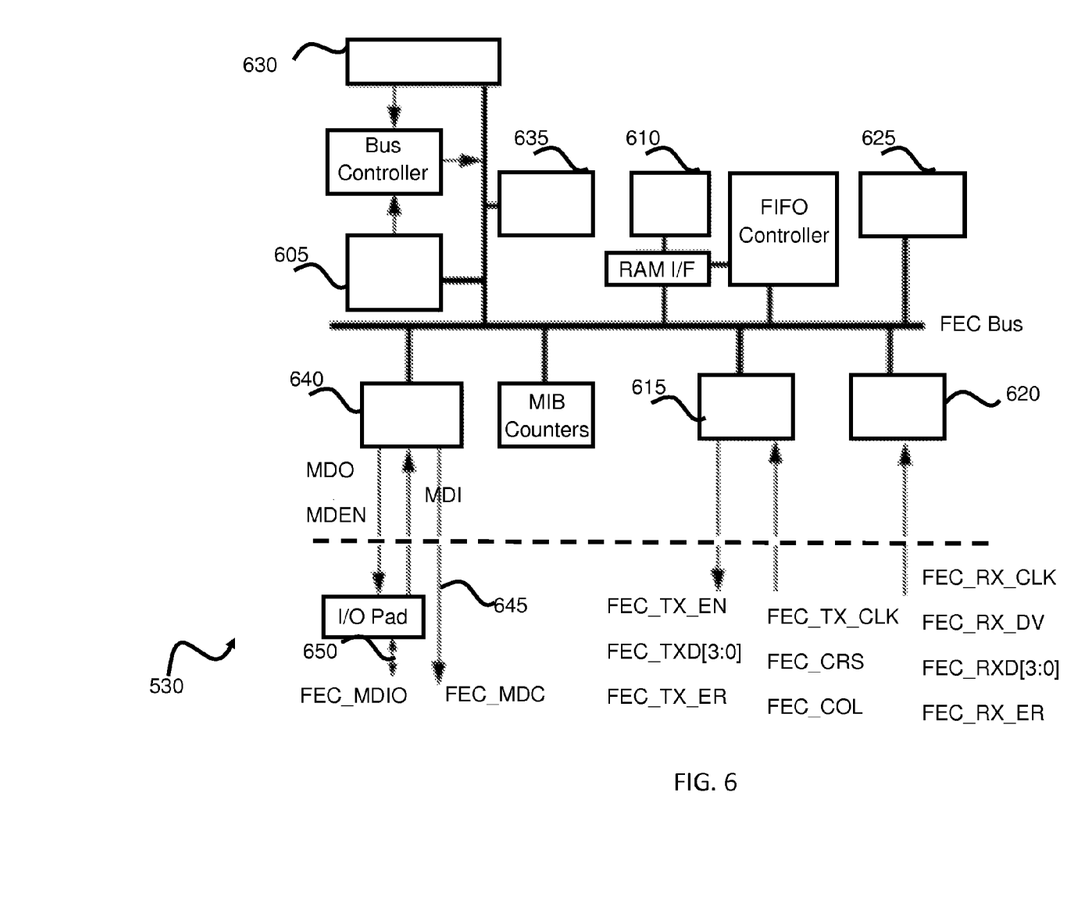
FIG. 6 illustrates a block diagram of an Ethernet MAC (Media Access Controller).

Referring now to FIG. 6, a more detailed system architecture and data flow of the example Fast Ethernet controller (FEC) 530 of FIG. 5 is illustrated. In this example, the FEC 530 is designed to support both 10-Mbps and 100-Mbps Ethernet/IEEE 802.3 networks. In some examples, an external transceiver interface and transceiver function may be required to complete the interface to the media. In this example, the FEC 530 may support three different standard physical interfaces (MAC-PHY) for connection to an external Ethernet transceiver (not shown). In some examples, the FEC 530 may be implemented with a combination of hardware and microcode.

In this example, the FEC 530 comprises a number of sub-modules. In the FEC 530 of FIG. 6, a descriptor 605 controller is employed, which in one example is a reduced instruction set computer (RISC)-based controller that may provide, for example, one or more of the following functions in the FEC 530:
  (i) Initialization (for example of those internal registers not initialized by the user or hardware);
  (ii) High-level control of the DMA channels (for example initiating DMA transfers);
  (iii) Interpreting buffer descriptors;
  (iv) Address recognition for receive frames; and (v) Random number generation for transmit collision back-off timer.

A random access memory (RAM) 610 is the focal point of all data flow in the FEC 530 and is divided into transmit and receive FIFOs (not shown). User data flows to and from DMA module 625, from and to receive/transmit FIFOs. Transmit data flows from the transmit FIFO to the transmit module 615, and receive data flows from the receive module 620 to the receive FIFO.

The user may control the FEC 530 by writing, through the slave interface (SIF) sub-module 630, to control registers located in each module. The control and status register (CSR) module 635 may provide global control (for example, Ethernet reset and enable) and interrupt handling registers. The DMA module 625 may support/provide multiple channels, thereby allowing transmit data, transmit descriptor, receive data and receive descriptor accesses to run independently. The transmit module 615 and receive module 620 may provide the Ethernet MAC functionality (with some assistance from microcode).

The data for FEC frames may reside in memory external to the FEC 530. The data for a frame is placed in one or more buffers. Associated with each buffer is a buffer descriptor (BD) which contains a starting address (pointer), data length, and status/control information (which contains the current state for the buffer). To permit maximum user flexibility, the BDs are also located in external memory and are read in by the FEC DMA engine.

Software produces buffers by allocating/initializing memory and initializing buffer descriptors. Setting the RxBD[E] or TxBD[R] bit 'produces' the buffer. Software writing to either the TDAR or RDAR tells the FEC that a buffer has been placed in external memory for the transmit data traffic or receive data traffic, respectively. The hardware reads the BDs and 'consumes' the buffers after they have been produced. After the data DMA is complete and the buffer descriptor status bits have been written by the DMA engine, the RxBD[E] or TxBD[R] bit is cleared by hardware to signal the buffer has been 'consumed'. Software can poll the BDs to detect when the buffers have been consumed or can rely on the buffer/frame interrupts.

These buffers can then be processed by the driver and returned to the free list.

Driver/DMA Operation with Transmit Buffer Descriptors

In this example mode of operation, data is presented to the FEC for transmission by arranging it in buffers referenced by the channel's transmit BDs. After the software driver has set up the buffers for a frame, it sets up the corresponding BDs. In the transmit BD the user initializes the control bits and the length (in bytes) in the first long-word, and the buffer pointer in the second long-word. The last step in setting up the BDs for a transmit frame is to set the R bit in the first BD for the frame. The driver follows that with a write to TDAR, which triggers the FEC to poll the next BD in the ring. The Ethernet controller confirms transmission by clearing the ready bit (R bit) when DMA of the buffer is complete.

Transmit Frame in Multiple Buffers

Typically, a transmit frame is divided between multiple buffers. For example, it is possible to have an application payload in one buffer, transmission control protocol (TCP) header in a 2nd buffer, IP header in a 3rd buffer, and Ethernet/IEEE 802.3 header in a 4th buffer. In essence, examples of the invention describe a construction of an Ethernet Frame from multiple fragments, in particular using a payload generated by, say, the Video encoder and a header generated by the CPU. These two data elements reside in different locations (e.g. SRAM and Video Encoder output buffer) and through the use of two BD (Buffer Descriptors) the FEC will assemble one complete Ethernet Frame.

In some examples, the FEC does not prepend the Ethernet header (Destination Address, Source Address, Length/Type field(s)), so this must be provided by the driver in one of the transmit buffers. The FEC can append the Ethernet cyclic redundancy check (CRC) to the frame. Whether the CRC is appended by the FEC or by the driver is determined by the TC bit in the transmit BD, which must be set by the driver.

The driver (transmit BD software producer) sets up transmit BDs in such a way that a complete transmit frame is given to the hardware at once. If a transmit frame consists of three buffers, first the BD's are initialized with pointer, length and control bits and then the transmit BD[R]bits are set to 1 in reverse order (3rd, 2nd, 1st BD) to insure that the complete frame is ready in memory before the DMA begins. If the transmit BDs are set up in order, the DMA controller could DMA the first BD before the 2nd was made available, potentially causing a transmit FIFO under-run.

In the FEC 530, the DMA module 625 is notified by the driver that new transmit frame(s) are available by writing to the TDAR register. When this register is written to (data value is not significant) the FEC RISC tells the DMA to read the next transmit BD in the ring. After started, the RISC+ DMA continues to read and interpret transmit BDs in order and DMA the associated buffers, until a transmit BD is encountered with the 'R' bit=0. At this point the FEC polls this BD one more time. If the 'R' bit=0 the second time, then the RISC stops the transmit descriptor read process until software sets up another transmit frame and writes to TDAR.

When the DMA module 625 of each transmit buffer is complete, the DMA module 625 writes back to the BD to clear the 'R' bit, indicating that the hardware consumer is finished with the buffer.

In addition to the transmit side buffers, in some examples the driver architecture may be configured to deal with the allocation and release of buffers for the receive side. In the receive side, buffers are owned by the driver of the Ethernet MAC. Once new data has been received, that buffer is typically handed over to the streaming application (e.g. Audio Amplifier). This means that this buffer is now removed from the queue from where receive data is delivered. When that data is read by the streaming peripheral, the data will no longer be needed and that buffer is preferably configured to return the buffer to this receive queue. However, an Ethernet driver and streaming peripheral driver are different software entities and therefore, a synchronization mechanism may be included, as known in the art to manage the receive process.

Figure 7:
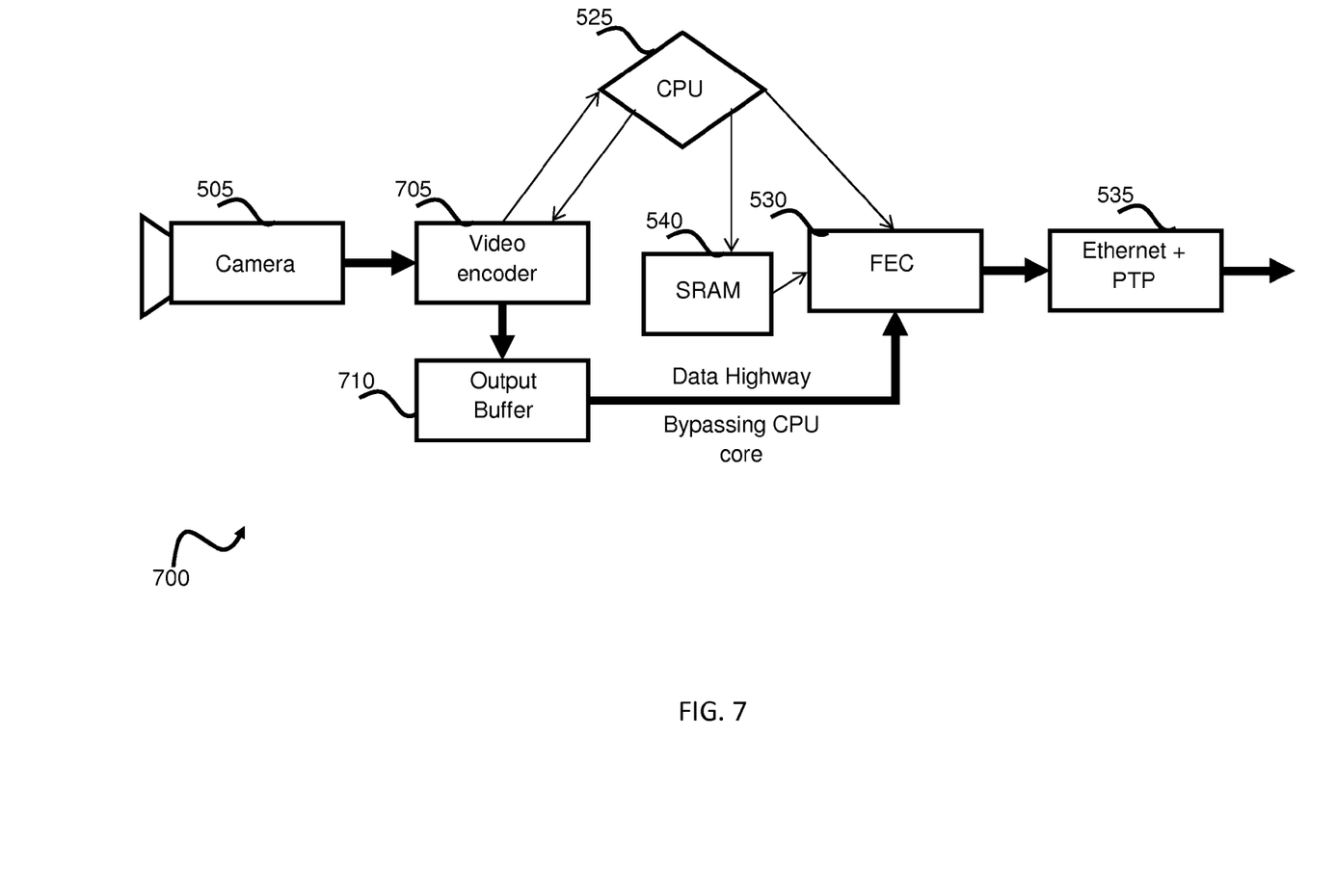
FIG. 7 illustrates a further simplified example flow of a data transfer employed by the Ethernet camera streaming SOC in FIG. 5.

Referring now to FIG. 7 a further simplified example block diagram 700 of an example of a part of a video streaming system is illustrated. The simplified example block diagram 700 comprises a camera, say camera 505 of FIG. 5, which transmits raw image data to a video encoder 705. The video encoder 705 then encodes the raw image data and transmits the encoded raw image data to output buffer 710. The video encoder 705 then notifies the CPU 525 that data is available. The CPU 525 generates at least one Network Frame header and prepares at least one descriptor in the system RAM 540. The CPU 525 notifies the FEC 530 that instructions are available in the SRAM in 540. In accordance with examples of the invention, the FEC 530 then obtains the header data from the SRAM and the encoded data directly from the output buffer 710 based on the instructions. The FEC 530 then transmits the frame data and obtained data to the Ethernet and PTP function 535. In this example, header data may be located in SRAM 540 and video data may be located in output buffer 710. In this example, these elements are thus located in different blocks within the video streaming system. In this example, the SRAM 540 is located at address 0×4000 0000 and the output buffer 710 is located at address 0×5000 0000. Therefore, data in an Ethernet Frame, comprising at least header data and video data, will have originated from different addresses within the system. Hence, individual sub buffers of one Ethernet Frame should not have any requirements to be contiguous (e.g. in address space).

Figure 8:
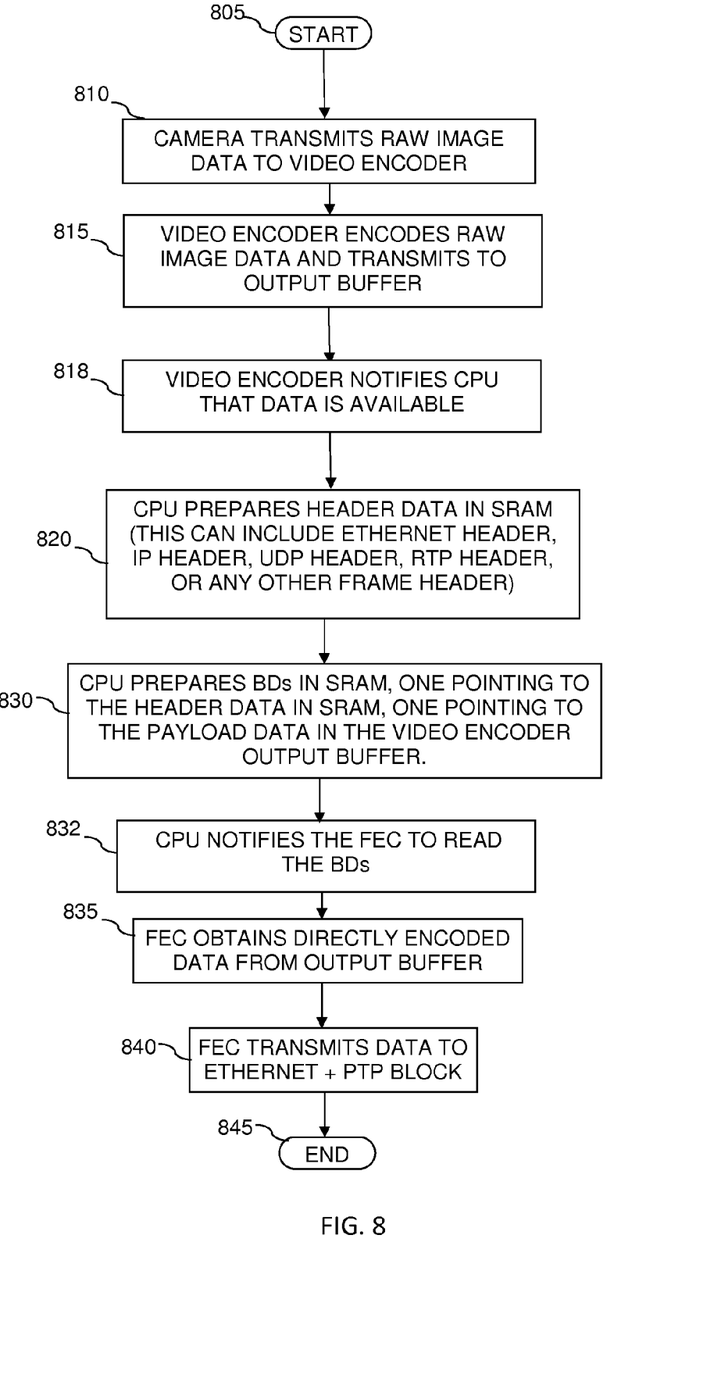
FIG. 8 illustrates a simplified flowchart of an example operation of a part of a video streaming system.

Referring now to FIG. 8, a simplified flowchart 800 of an example operation of a part of a video streaming system is illustrated. The example flowchart commences in 805 with a camera being switched on and the camera transmits raw image data to a video encoder in 810. The video encoder then encodes the raw image data and transmits the encoded raw image data in 815. The video encoder then notifies the CPU that data is available in 818. The CPU in 820 prepares the frame headers (e.g. Ethernet, IP, UDP, RTP or some other headers, by updating at least one frame header or preparing at least one separate header data element) and stores them in memory, such as internal SRAM. In 830 the CPU prepares at least two buffer descriptors (BD) for the FEC, one or multiple, that point to the headers in SRAM and one, that points to the payload inside the Video Encoder output buffer. In 832 the CPU notifies the FEC that the at least one descriptor(s) is/are available in the SRAM. In accordance with examples of the invention, the FEC then obtains the encoded data directly from the output buffer based on the instructions in 835. The FEC then transmits the obtained data to the Ethernet and PTP block in 840 and the flowchart ends in 845.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

The invention claimed is:

1. A method of data streaming in a streaming system comprising a processor, a controller distinct from the processor, a random access memory storing a descriptor list, a streaming peripheral having a buffer area, and a shared interconnect coupling the processor, the controller, the random access memory, and the streaming peripheral, the method comprising:
   determining, by the processor, a location of a payload in the buffer area of the streaming peripheral;
   generating, by the processor, frame header data for a network interface;
   storing, by the processor, the frame header data in the random access memory;
   preparing, by the processor, a first descriptor pointing to the frame header data in the random access memory;
   storing, by the processor, the first descriptor in the descriptor list of the random access memory;
   preparing, by the processor, a second descriptor pointing to the location of the payload in the buffer area of the streaming peripheral;
   storing, by the processor, the second descriptor in the descriptor list of the random access memory;
   reading, by the controller, the first and the second descriptors from the descriptor list;
   fetching, by the controller, the frame header data from the random access memory based on the first descriptor; and
   fetching, by the controller, the payload from the buffer area of the streaming peripheral based on the second descriptor.

2. The method of claim 1 further comprising:
   notifying, by the processor, the controller that the first identifier is stored in the descriptor list.

3. The method of claim 1 wherein the processor is a central processing unit core.

4. The method of claim 1 wherein generating the frame header data for the network interface comprises at least one of: generating a separate header, and updating network frame header data.

5. The method of claim 1 further comprising:
   notifying, by the processor, the controller that the second identifier is stored in the descriptor list.

6. The method of claim 5 wherein the frame header data and the descriptor list are stored in distinct address ranges in the random access memory.

7. The method of claim 1 wherein the controller is an Ethernet controller.

8. The method of claim 1 wherein the streaming peripheral is a camera comprising a video encoder and memory and the payload comprises image data.

9. The method of claim 1 wherein the streaming peripheral is a video interface or an audio interface.

10. The method of claim 2 wherein generating the frame header data for the network interface comprises at least one of: generating a separate header, and updating network frame header data.

11. The method of claim 2 wherein the controller is an Ethernet controller.

12. The method of claim 2 wherein the streaming peripheral is a camera comprising a video encoder and memory and the payload comprises image data.

13. The method of claim 2 wherein the streaming peripheral is a video interface or an audio interface.

14. A streaming system comprising:
   a processor;
   a controller distinct from the processor;
   a random access memory storing a descriptor list;
   a streaming peripheral having a buffer area; and
   a shared interconnect coupling the processor, the controller, the random access memory, and the streaming peripheral, wherein the processor is configured to:
   store a frame header data in the random access memory,
   prepare a first descriptor pointing to the frame header data in the random access memory,
   store the first descriptor in the descriptor list of the random access memory,
   prepare a second descriptor pointing to a location of a payload in the buffer area of the streaming peripheral, and
   store the second descriptor in the descriptor list of the random access memory, and wherein the controller is configured to:
   read the first and the second descriptors from the descriptor list,
   fetch the frame header data from the random access memory based on the first descriptor, and
   fetch the payload from the buffer area of the streaming peripheral based on the second descriptor.

15. The streaming system of claim 14 wherein the processor is further configured to notify the controller that the first identifier is stored in the descriptor list.

16. The streaming system of claim 14 wherein the processor is further configured to notify the controller that the second identifier is stored in the descriptor list.

17. The streaming system of claim 14 wherein the processor is a central processing unit core.

18. The streaming system of claim 14 wherein the controller is an Ethernet controller.

19. The streaming system of claim 14 wherein the frame header data and the descriptor list are stored in distinct address ranges in the random access memory.

20. The streaming system of claim 14 wherein the streaming peripheral is a camera comprising a video encoder and memory and the payload comprises image data.

* * * * *